United States Patent
Chang et al.

(10) Patent No.: US 11,295,220 B2
(45) Date of Patent: Apr. 5, 2022

(54) METHOD AND APPARATUS WITH KEY-VALUE COUPLING

(71) Applicant: SAMSUNG ELECTRONICS CO., LTD., Suwon-si (KR)

(72) Inventors: Hyun Sung Chang, Seoul (KR); Wonhee Lee, Yongin-si (KR); Nahyup Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 106 days.

(21) Appl. No.: 16/535,502

(22) Filed: Aug. 8, 2019

(65) Prior Publication Data
US 2020/0320408 A1    Oct. 8, 2020

(30) Foreign Application Priority Data
Apr. 2, 2019 (KR) .......................... 10-2019-0038595

(51) Int. Cl.
| | | |
|---|---|---|
| *G06K 9/00* | (2006.01) | |
| *G06N 5/04* | (2006.01) | |
| *G06F 16/532* | (2019.01) | |
| *G06K 9/62* | (2022.01) | |
| *G06N 3/04* | (2006.01) | |

(52) U.S. Cl.
CPC ............. *G06N 5/04* (2013.01); *G06F 16/532* (2019.01); *G06K 9/6248* (2013.01); *G06N 3/04* (2013.01)

(58) Field of Classification Search
None
See application file for complete search history.

(56) References Cited

U.S. PATENT DOCUMENTS

| | | | |
|---|---|---|---|
| 7,373,615 B2 | 5/2008 | Dougherty, Jr. et al. | |
| 8,515,879 B2 | 8/2013 | Huh et al. | |
| 9,934,714 B2 | 4/2018 | Heide et al. | |
| 2017/0293804 A1 | 10/2017 | Min et al. | |
| 2018/0350034 A1* | 12/2018 | Chen .......................... | G06T 3/40 |

(Continued)

FOREIGN PATENT DOCUMENTS

| | | |
|---|---|---|
| CN | 101739670 A | 6/2010 |
| CN | 104050508 A | 9/2014 |

(Continued)

OTHER PUBLICATIONS

Buades A., "A Non-Local Algorithm for Image Denoising", *IEEE Computer Society Conference on Computer Vision and Pattern Recognition*, vol. 2, Jun. 2005, pp. 60-65 (6 pages in English).

(Continued)

*Primary Examiner* — Wei Wen Yang
(74) *Attorney, Agent, or Firm* — NSIP Law

(57) ABSTRACT

A processor-implemented method of implementing an attention mechanism in a neural network includes obtaining key-value coupling data determined based on an operation between new key data determined using a first nonlinear transformation for key data of an attention layer, and value data of the attention layer corresponding to the key data; determining new query data by applying a second nonlinear transformation to query data corresponding to input data of the attention layer; and determining output data of the attention layer based on an operation between the new query data and the key-value coupling data.

19 Claims, 12 Drawing Sheets

(56) References Cited

U.S. PATENT DOCUMENTS

2019/0130213 A1* 5/2019 Shazeer ............... G06K 9/6262
2020/0250528 A1* 8/2020 van den Oord ...... G06N 3/0454

FOREIGN PATENT DOCUMENTS

| CN | 105678704 A | 6/2016 |
| CN | 106296591 A | 1/2017 |
| KR | 10-2015-0037369 A | 4/2015 |
| KR | 10-2018-0082315 A | 7/2018 |

OTHER PUBLICATIONS

Rahimi A., et al., "Random Features for Large-Scale Kernel Machines", *Advances in neural information processing systems*, 2008, pp. 1-8 (8 pages in English).

He K., et al., "Guided Image Filtering", *IEEE transactions on pattern analysis and machine intelligence*, vol. 35 Issue 6, Oct. 2012. pp. 1-14 (14 pages in English).

Vaswani A., et al., "Attention is All You Need", *31$^{st}$ Conference on Neural Information Processing Systems*, 2017, pp. 1-11 (11 pages in English).

Zhou B., et al., "Temporal Relational Reasoning in Videos, *The European Conference on Computer Vision*" 208, pp. 1-1 (1 page in English).

Wang A., et al., "Non-local Neural Networks", *Proceedings of the IEEE Conference on Computer Vision and Pattern Recognition*, 2018, pp. 7794-7803 (10 pages in English).

* cited by examiner

METHOD AND APPARATUS WITH KEY-VALUE COUPLING

CROSS-REFERENCE TO RELATED APPLICATIONS

This application claims the benefit under 35 USC § 119(a) of Korean Patent Application No. 10-2019-0038595 filed on Apr. 2, 2019 in the Korean Intellectual Property Office, the entire disclosure of which is incorporated herein by reference for all purposes.

BACKGROUND

1. Field

The following description relates to a method and apparatus with a key-value mechanism.

2. Description of Related Art

An attention algorithm (e.g., an attention mechanism) is a neural network-based technology for focusing on highly significant data among provided input data. For example, the attention algorithm may use key-value pairs. Input data (queries) of an attention layer may be compared to keys in the key-value pairs. When weights for the keys are calculated based on a comparison result, a weighted average according to the weights may be applied to values, whereby output data of the attention layer may be generated. In this example, similarity processing may be used for comparing the queries and the keys. Meanwhile, similarity processing may be used for filtering or removing noise in an image. For example, a similarity between pixels or a similarity between patches may be used in bilateral filtering or a nonlocal-means algorithm. Similarity processing may be used in bilateral filtering to find neighboring pixels having pixel values similar to that of a target pixel being a denoising target. Similarity processing may be used in the nonlocal-means algorithm to find a patch similar to a target patch to which the target pixel being the denoising target belongs.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method of implementing an attention mechanism in a neural network includes: obtaining key-value coupling data determined based on an operation between new key data determined using a first nonlinear transformation for key data of an attention layer, and value data of the attention layer corresponding to the key data; determining new query data by applying a second nonlinear transformation to query data corresponding to input data of the attention layer; and determining output data of the attention layer based on an operation between the new query data and the key-value coupling data.

The obtaining may include: determining the new key data by applying the first nonlinear transformation to the key data; and determining the key-value coupling data based on an operation between the value data and the new key data.

The new key data may include a first new key, and the value data may include a first value corresponding to the first new key, and the key-value coupling data may include a single item of aggregated data determined based an operation between the first new key and the first value with respect to a first key-value pair of the first new key and the first value.

Either one or both of the first nonlinear transformation and the second nonlinear transformation may use either one or both of a sine function and a cosine function as a nonlinear factor.

The first nonlinear transformation and the second nonlinear transformation may use the same function.

The key-value coupling data may be fixed based on an operation between the new key data and the value data, and the output data of the attention layer may be determined based on an operation between the new query data and the fixed key-value coupling data.

The key-value coupling data may be fixed by being determined, independent of the query data, based on the operation between the new key data and the value data.

An operation between the new key data and the new query data may correspond to a similarity between the key data and the query data.

The determining of the output data of the attention layer may include normalizing a result of the operation between the new query data and the key-value coupling data.

The method may further include performing an inference operation using the neural network based on the output data of the attention layer, wherein the neural network includes additional trained layers.

The method may further include outputting an image recognition result for the input data by applying the output data of the attention layer to the neural network.

A non-transitory computer-readable storage medium storing instructions that, when executed by one or more processors, cause the one or more processors to perform the method.

In another general aspect, a processor-implemented nonlocal filtering method may include: obtaining key-value coupling data determined based on an operation between new key data determined using a first nonlinear transformation for key data corresponding to patches in an input image, and value data of representative pixels in the patches; determining new query data by applying a second nonlinear transformation to query data corresponding to a target patch among the patches; and determining output data for denoising of a representative pixel in the target patch, based on an operation between the new query data and the key-value coupling data.

The representative pixels in the patches may be center pixels in the patches, and the representative pixel in the target patch may be a center pixel in the target patch.

The obtaining may include: determining the new key data by applying the first nonlinear transformation to the key data; and determining the key-value coupling data based on an operation between the value data and the new key data.

The new key data may include a first new key, and the value data may include a first value corresponding to the first new key, and the key-value coupling data may include a single item of aggregated data determined based on an operation between the first new key and the first value with respect to a first key-value pair of the first new key and the first value.

Either one or both of the first nonlinear transformation and the second nonlinear transformation may use either one or both of a sine function and a cosine function as a nonlinear factor.

The first nonlinear transformation and the second nonlinear transformation may use the same function.

An operation between the new key data and the new query data may correspond to a similarity between the key data and the query data.

The method may further include denoising the representative pixel in the target patch based on the output data.

In another general aspect, a processor-implemented method of implementing a neural network includes: performing an inference related to input data of the neural network using a plurality of layers in the neural network, wherein at least one of the plurality of layers in the neural network uses either one or both of a sine function and a cosine function to obtain a nonlinearity.

The at least one layer may be a respective attention layer that performs a corresponding attention mechanism.

The performing may include: obtaining key-value coupling data determined based on an operation between new key data determined using a first nonlinear transformation for key data of the attention layer, and value data of the attention layer corresponding to the key data; determining new query data by applying a second nonlinear transformation to query data corresponding to input data of the attention layer; and determining output data of the attention layer based on an operation between the new query data and the key-value coupling data.

Either one or both of the first nonlinear transformation and the second nonlinear transformation may use either one or both of the sine function and the cosine function.

In another general aspect, a processor-implemented method of implementing an attention mechanism in a neural network includes: obtaining fixed key-value coupling data determined, independently of input query data of an attention layer, based on key data of the attention layer and value data corresponding to the key data; determining new query data based on input query data of the attention layer; and determining output data of the attention layer based on an operation between the new query data and the key-value coupling data.

The new key data may be determined by applying a first nonlinear transformation to the key data, the key-value coupling data may be determined based on an operation between the value data and the new key data, and the determining of the new query data may include applying a second nonlinear transformation to query data.

The method may further include implementing the neural network to perform an attention-based inference operation for input image data, using the output data of the attention layer.

Other features and aspects will be apparent from the following detailed description, the drawings, and the claims.

Figure 1:
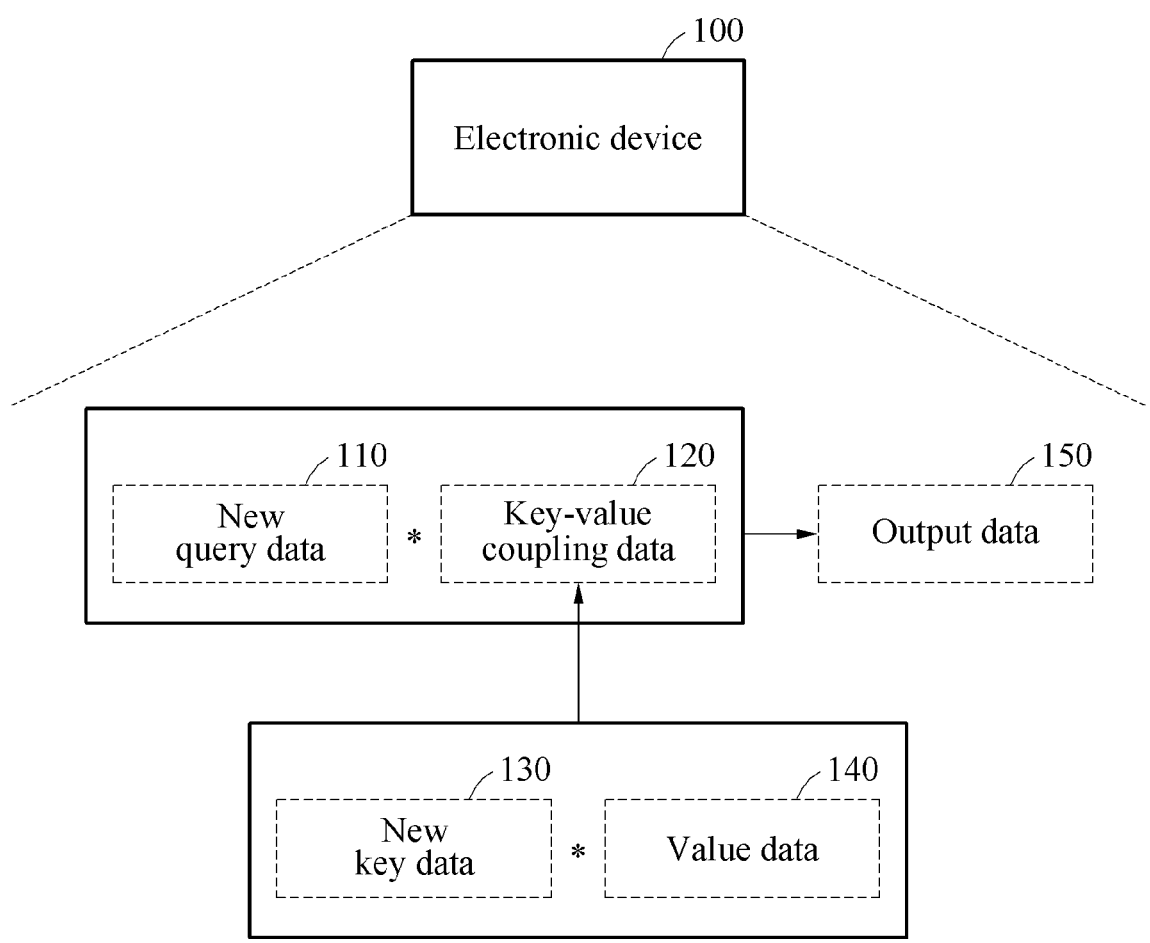
FIG. 1 illustrates an example of an electronic device using key-value coupling.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and after an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

Hereinafter, examples will be described in detail with reference to the accompanying drawings. In the drawings, like reference numerals are used for like elements.

FIG. 1 illustrates an example of an electronic device using key-value coupling. Referring to FIG. 1, an electronic device 100 generates output data 150 based on an operation between new query data 110 and key-value coupling data 120. The key-value coupling data 120 is generated based on an operation between new key data 130 and value data 140. Operations to be described below may be construed as being performed by the electronic device 100.

A neural network may include an attention layer including an attention algorithm. The attention layer may be at least one of a plurality of layers making up the neural network, and may be inserted into the neural network (e.g., after one or more layers have already been partially trained). The attention algorithm may be used to determine relatively significant data among data to be processed by the neural network.

The attention algorithm may use a query and a key-value pair. The query may search over the keys of words that might supply context for it. Those keys may be related to values that encode more meaning about the key word. The query may correspond to an input (for example, an input feature vector) of the attention layer. When a query is input into the attention layer, similarities between the query and keys are calculated, and a weighted average of values may be calculated based on weights corresponding to the calculated similarities. The calculated weighted average of the values may correspond to an output (for example, an output feature vector) of the attention layer which may then be advanced or forwarded to a next layer of the neural network.

A complexity of an operation for generating the output data 150 (which will be described in detail below) may depend on a number of queries and a number of keys. When there is an increased number of queries, the complexity of the corresponding operation may be increased. The electronic device 100 of one or more embodiments greatly lowers the complexity of the operation, compared to the operation of typical electronic devices, by using the key-value coupling data 120 in which the new key data 130 and the value data 140 are aggregated, thereby greatly improving a performance of the example electronic device 100 over the typical electronic devices performing the more complex operation. The use of the term "may" herein with respect to an example or embodiment (e.g., as to what an example or embodiment may include or implement) means that at least one example or embodiment exists where such a feature is included or implemented, while all examples are not limited thereto.

For example, when the new key data 130 and the value data 140 are determined, and the key-value coupling data 120 is generated based on an operation between the new key data 130 and the value data 140, the key-value coupling data 120 may be fixed. That the key-value coupling data 120 is fixed indicates that the key-value coupling data 120 is determined independent of a query. That is, when there is a plurality of queries, the output data 150 may be generated based on an operation between the new query data 110 and the key-value coupling data 120, without comparing the queries to keys, for example. Thus, an increment in the complexity of the operation resulting from an increase in the number of queries may greatly decrease.

The new query data 110 may be generated by applying a nonlinear transformation to query data, and the new key data 130 may be generated by applying a nonlinear transformation to key data, which will be described in detail below.

Examples exist with the nonlinear transformation applied to the query data and the nonlinear transformation applied to the key data use the same function, and examples exist where they use different functions. For example, either one or both of a nonlinear transformation applied to the query data and a nonlinear transformation applied to the key data may use either one or both of a sine function and a cosine function as a nonlinear factor.

Such similarity processing is likewise applicable to filtering or removing noise in an image. For example, nonlocal filtering adjusts a pixel value of a pixel including noise based on a similarity between patches, and may use the key-value coupling data 120 to process the similarity between the patches.

For example, in an example of an attention algorithm, query data may correspond to the input feature vector of the attention layer, and the output data 150 may correspond to the output feature vector (for example, an attention output) of the attention layer. In an example of nonlocal filtering, query data corresponds to pixel values of pixels in a target patch among patches in an input image, and the output data 150 is a pixel value for denoising of a target pixel in the target patch. In the example of the attention algorithm, the electronic device 100 may correspond to a neural network apparatus using a neural network. In the example of nonlocal filtering, the electronic device 100 may correspond to an image processing apparatus.

A non-limiting example of the attention algorithm will be described below, and the following example of the attention algorithm may also apply to the example of nonlocal filtering. Further, the example of nonlocal filtering will also be described further later.

Figure 2:
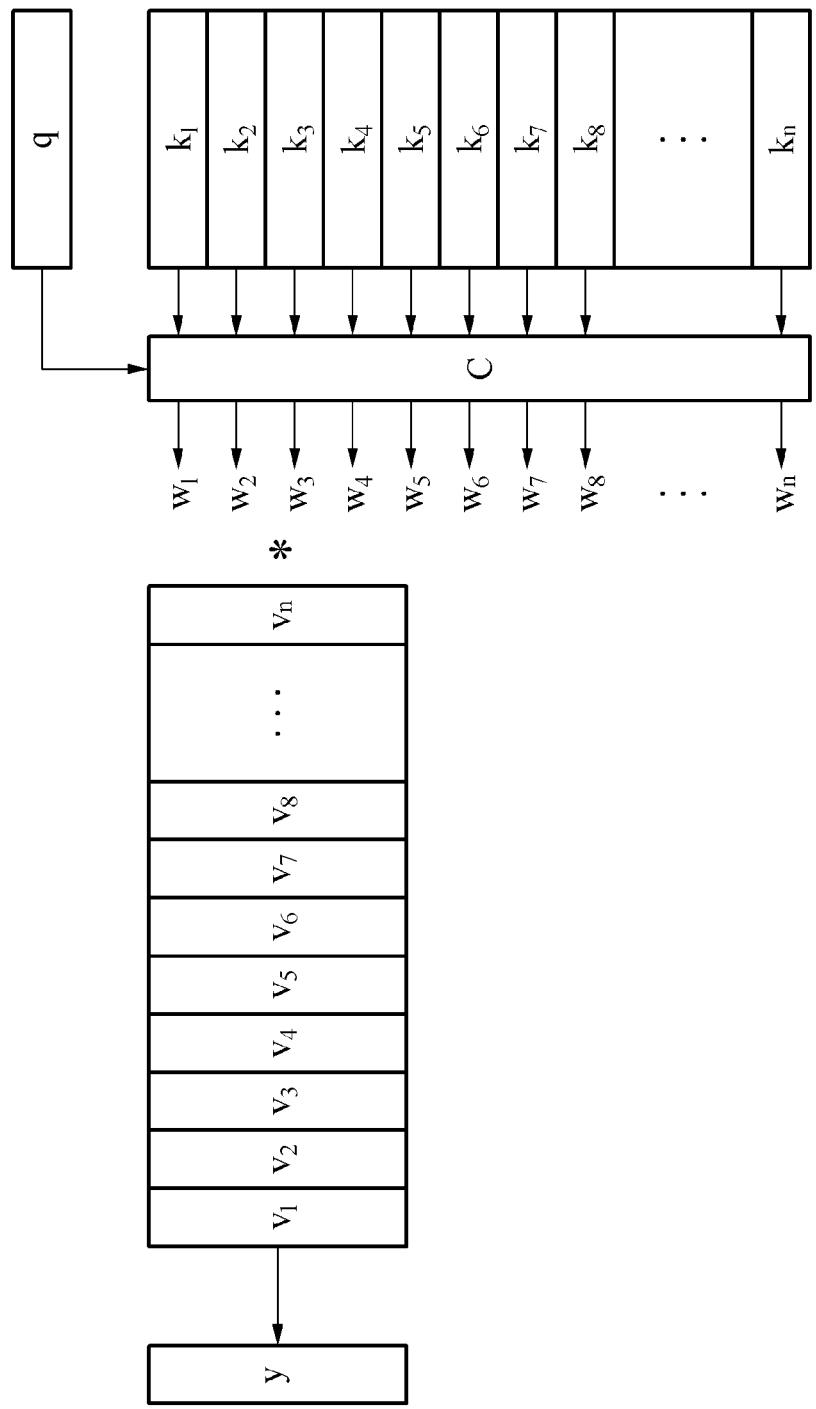
FIG. 2 illustrates an example of using a key-value pair in an unpaired state.

FIG. 2 illustrates an example of using a key-value pair in an unpaired state. Referring to FIG. 2, key data $k_1$ through $k_n$ and value data $v_1$ through $v_n$ are illustrated. The key data $k_x$ and the value data $v_x$ are paired. Here, x denotes an integer of 1 to n. A data set including the key data $k_1$ through $k_n$ and the value data $v_1$ through $v_n$ is referred to as a key-value pair.

A comparison block C compares query data q and the key data $k_1$ through $k_n$, and outputs weight data $w_1$ through $w_n$ corresponding to similarities between the query data q and the key data $k_1$ through $k_n$. Then, output data y is generated based on an operation between the value data $v_1$ through $v_n$ and the weight data $w_1$ through $w_n$. For example, the output data y corresponds to a weighted average of the value data $v_1$ through $v_n$ based on the weight data $w_1$ through $w_n$.

The weight data $w_1$ through $w_n$ may be calculated based on Equation 1.

$$w_j = A(q, k_j) \qquad \text{Equation 1:}$$

In Equation 1, $w_j$ denotes the weight data $w_1$ through $w_n$, A denotes a similarity function, and $k_j$ denotes the key data $k_1$ through $k_n$. j denotes an index for data identification. For example, the similarity function A may be expressed by Equation 2.

$$A(u,v) \propto e^{-\|u-v\|^2 / 2\sigma^2} \qquad \text{Equation 2:}$$

In Equation 2, u and v denote data to be compared, and $\sigma^2$ denotes a variance. The output data y may be expressed by Equation 3, for example.

$$y = \frac{\sum_{j=1}^{n} w_j v_j}{\sum_{j=1}^{n} w_j} \qquad \text{Equation 3}$$

In Equation 3, y denotes the output data, $w_j$ denotes the weight data $w_1$ through $w_n$, and $v_j$ denotes the value data $v_1$ through $v_n$. j denotes an index. According to Equation 3, the output data y denotes a weighted average of $v_j$ with respect to $w_j$. In Equation 3, a denominator term is for a normalization. Hereinafter, for ease of description, the term for normalization may be omitted when referring to the output data, though it may be appreciated after an understanding of the present disclosure that a normalization term corresponding to the denominator term of Equation 3 may be applied for normalization.

Equations 1 through 3 may represent an example in which there is a single item of query data q. In such an example, a complexity for calculating the output data y may be indicated as O(n). n denotes a number of the key data $k_1$ through $k_n$. When the query data q increases, the complexity of operation may greatly increases in a typical case of using key-value pairs in an unpaired state. Equations 4 and 5 may represent an example in which there is a plurality of items of query data q. In such an example, the query data is indicated as $q_i$. i denotes an index, and has a value of 1 to m. That is, a number of the items of query data q may be m.

$$w_{ij} = A(q_i, k_j) \quad \text{Equation 4}$$

$$y_i = \sum_{j=1}^{n} w_{ij} v_j = \sum_{j=1}^{n} A(q_i, k_j) v_j \quad \text{Equation 5}$$

Equation 2 may be used for the similarity function A of Equation 4. When there is a plurality of (for example, m) items of query data q, similarities between each item of query data q and the key data $k_1$ through $k_n$ may be calculated with respect to each item of query data q, and thus a complexity for calculating the output data y may be indicated as O(m*n). Therefore, in a typical case of using key-value pairs in an unpaired state, the number of the items of query data q increases, and the complexity of operation increases greatly.

Figure 3:
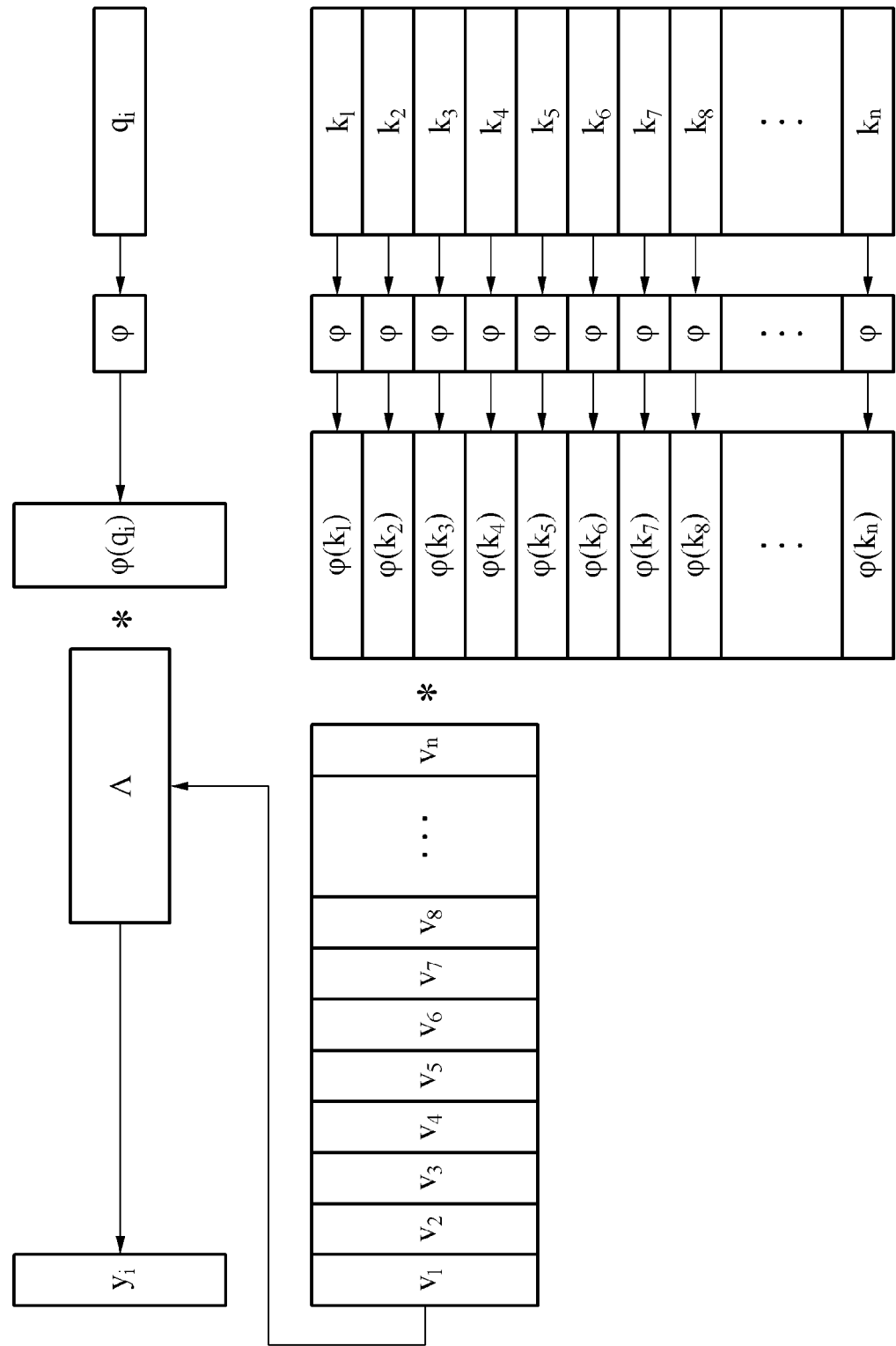
FIG. 3 illustrates an example of using key-value coupling.

FIG. 3 illustrates an example of one or more embodiments using key-value coupling. In an example, a similarity between data u and data v may be expressed by Equation 6.

$$A(u,v) \approx \varphi_1(u)^T \varphi_2(v) \quad \text{Equation 6:}$$

In Equation 6, $\varphi_1$ and $\varphi_2$ denotes nonlinear functions for assigning a nonlinearity respectively to the data (u, v). The nonlinear function $\varphi_1$ and the nonlinear function $\varphi_2$ may correspond to the same function or may correspond to respective different functions. Assigning a nonlinearly to data is construed as performing a nonlinear transformation on the data. Hereinafter, an example in which the nonlinear function $\varphi_1$ and the nonlinear function $\varphi_2$ are the same will be described. However, the following description does not limit the scope of a right for an example in which the nonlinear function $\varphi_1$ and the nonlinear function $\varphi_2$ are different.

To determine a similarity between provided data, nonlinear factors between the data may be considered. Thus, to determine a similarity A(u, v) between the data u and the data v, A(u, v) may divided into a nonlinear term $\varphi_1(u)$ related to the data u and a nonlinear term $\varphi_2(v)$ related to the data v. Such a division process is referred to as a factorization. To obtain a scalar value, $\varphi_1(u)$ may be transposed.

In an example, the similarity between the data u and the data v may be expressed by Equation 7.

$$A(u, v) \approx \frac{1}{d} \sum_{j=1}^{d} 2\cos(\omega_j^T u + b)\cos(\omega_j^T v + b) \quad \text{Equation 7}$$

$$= \sum_{j=1}^{d} \varphi_j(u)\varphi_j(v)$$

$$= \varphi(u)^T \varphi(v).$$

In Equation 7, d denotes a constant which determines an approximation precision in approximating the similarity A(u, v) using a combination of cosine terms. When the similarity function A is expressed by a difference δ=u−v of two vectors u and v to be compared, for example, as in Equation 2, $\omega_j$ and b may be expressed by Equation 8.

$$\omega_j \sim p(\omega) = \text{IFFT}[A(\delta)],$$

$$b \sim \text{Uniform}(0, 2\pi) \quad \text{Equation 8:}$$

In Equation 8, IFFT denotes an inverse fast Fourier transform, and ~ denotes an independent sample extraction from a corresponding probability density function. According to Equation 7, a nonlinear function may be expressed by Equation 9, for example.

$$\varphi_j(u) = \sqrt{\frac{2}{d}} \cos(\omega_j^T u + b) \quad \text{Equation 9}$$

The nonlinear function according to Equation 8 includes a cosine function as a nonlinear factor. Equation 8 may be changed to various forms according to formulas in relation to trigonometric functions. Thus, the nonlinear function may use either one or both of a sine function and a cosine function as the nonlinear factor.

Referring to FIG. 3, new key data $\varphi(k_1)$ through $\varphi(k_n)$ are generated by applying a nonlinear transformation $\varphi$ to key data $k_1$ through $k_n$, and key-value coupling data Λ is generated based on an operation between the value data $v_1$ through $v_n$ and the new key data $\varphi(k_1)$ through $\varphi(k_n)$. The key-value coupling data Λ aggregates the new key data $\varphi(k_1)$ through $\varphi(k_n)$ and the value data $v_1$ through $v_n$. For example, the key-value coupling data Λ includes a single item of aggregated data $v_1 * \varphi(k_1)^T$ generated based on an operation between a new key $\varphi(k_1)$ and a value $v_1$ with respect to a key-value pair of the new key $\varphi(k_1)$ and the value $v_1$.

Then, new query data $\varphi(q_j)$ is generated by applying a nonlinear transformation $\varphi$ to query data $q_j$, and output data $y_i$ is generated based on an operation between the new query data $\varphi(q_j)$ and the key-value coupling data Λ. Here, a dimension increases as a consequence of the nonlinear transformation $\varphi$, and the operation is a multiplying operation. Generating the output data $y_i$ may thus include normalizing a result of the operation between the new query data $\varphi(q_j)$ and the key-value coupling data Λ.

According to an example, a key-value pair may be generated based on input data. Here, the key-value coupling data Λ may be generated based on the input data. In this example, an electronic device may generate the new key data $\varphi(k_1)$ through $\varphi(k_n)$ by applying the nonlinear transformation $\varphi$ to the key data $k_1$ through $k_n$, and may generate the key-value coupling data Λ based on the operation between the value data $v_1$ through $v_n$ and the new key data $\varphi(k_1)$ through $\varphi(k_n)$. According to an example, a key-value pair may be generated in advance through pretraining. Here, the key-value coupling data Λ generated in advance may be loaded from a memory and used. Hereinafter, an expression "obtaining key-value coupling data Λ" will be used, and the expression may be construed as covering either and both of examples where the key-value pair is generated based on the input data and examples where the key-value pair is generated in advance through pretraining.

According to an example of one or more embodiments in which the key-value coupling data Λ is used, the output data $y_i$ may be expressed by Equation 10.

$$y_i = \sum_{j=1}^{n} A(q_i, k_j) v_j \approx \sum_{j=1}^{n} v_j \varphi(k_j)^T \varphi(q_i) = \Lambda \varphi(q_i) \quad \text{Equation 10}$$

In Equation 10, $v_j$ denotes the value data $v_1$ through $v_n$, $\varphi(k_j)$ denotes the new key data $\varphi(k_1)$ through $\varphi(k_n)$, and $\varphi(q_j)$ denotes the new query data $\varphi(q_1)$ through $\varphi(q_n)$. Λ denotes the key-value coupling data, which may be generated based on an operation between $v_j$ and $\varphi(k_j)$. According to Equation 10, an operation between the new key data $\varphi(k_1)$ through $\varphi(k_n)$ and the new query data $\varphi(q_1)$ through $\varphi(q_n)$ corresponds to a similarity $A(q_i, k_j)$ between the key data $k_1$ through $k_n$ and the query data $q_1$ through $q_n$.

A complexity for calculating the key-value coupling data Λ may be indicated as O(n). Further, when the key-value coupling data Λ is calculated, the key-value coupling data Λ may be fixed. Thus, a complexity of operation related to m items of query data $q_i$ may be indicated as O(m). Therefore, in the example of one or more embodiments, a total complexity of operation may be indicated as O(n+m), which exhibits a great decrease in total complexity of operation when compared to the complexity O(m*n) according to a typical example in which a key-value pair is used in an unpaired state. As a number of the items of query data $q_i$ and a number of key-value pairs increase, there is a further increase in the extent of the decrease in total complexity of operation of the example of one or more embodiments compared to that of the typical example. By decreasing the total complexity in operation compared to the typical example, the example of one or more embodiments may improve a processing speed, or may reduce the total processing power needed to efficiently process the operations, of one or more processors of the electronic device 100 on which the operations may be performed.

Figure 4:
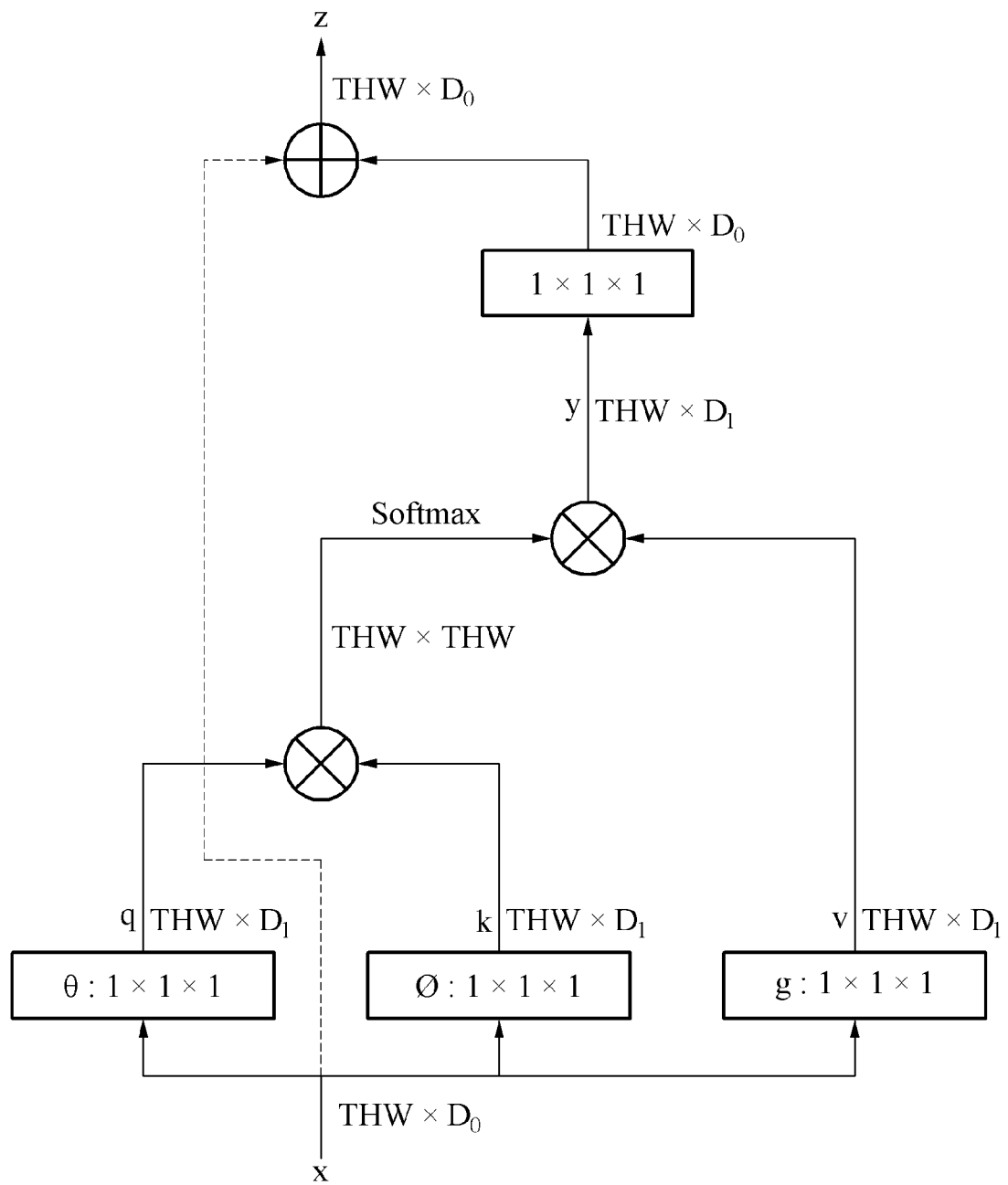
FIGS. 4 and 5 illustrate examples of data processing in a scheme of using a key-value pair in an unpaired state.
Figure 5:
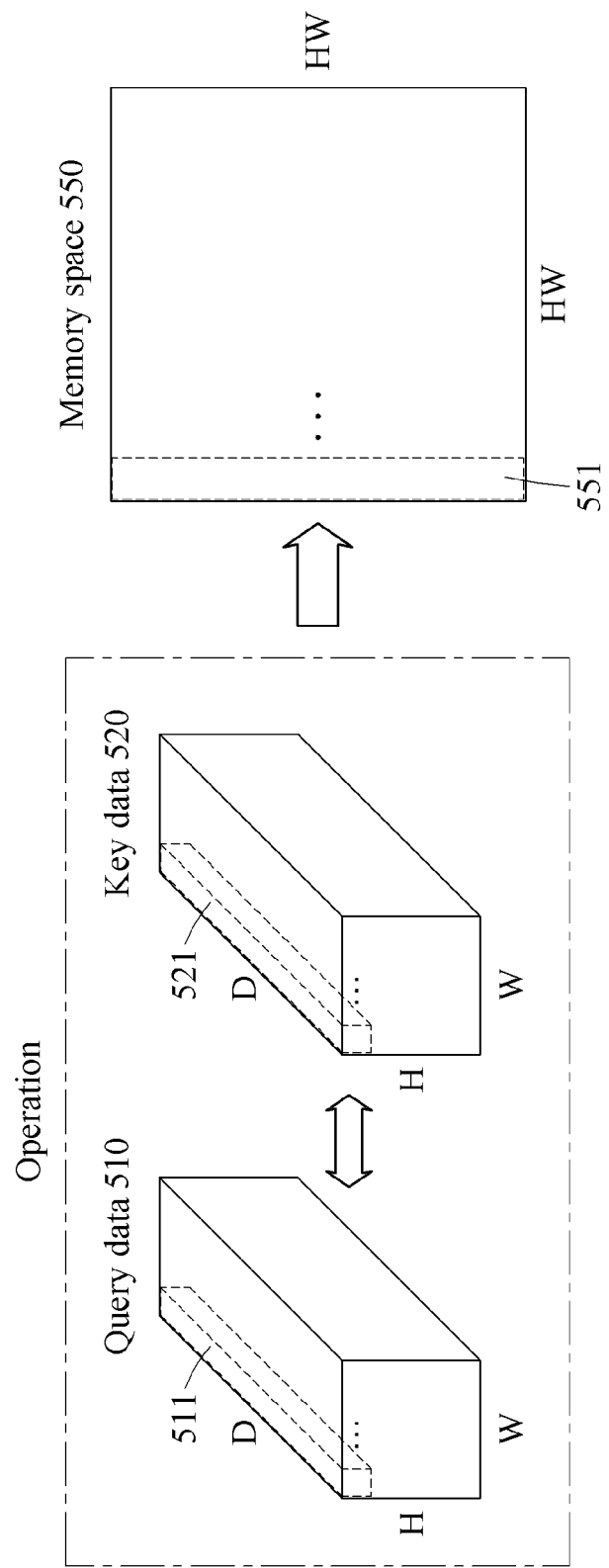
Figure 6:
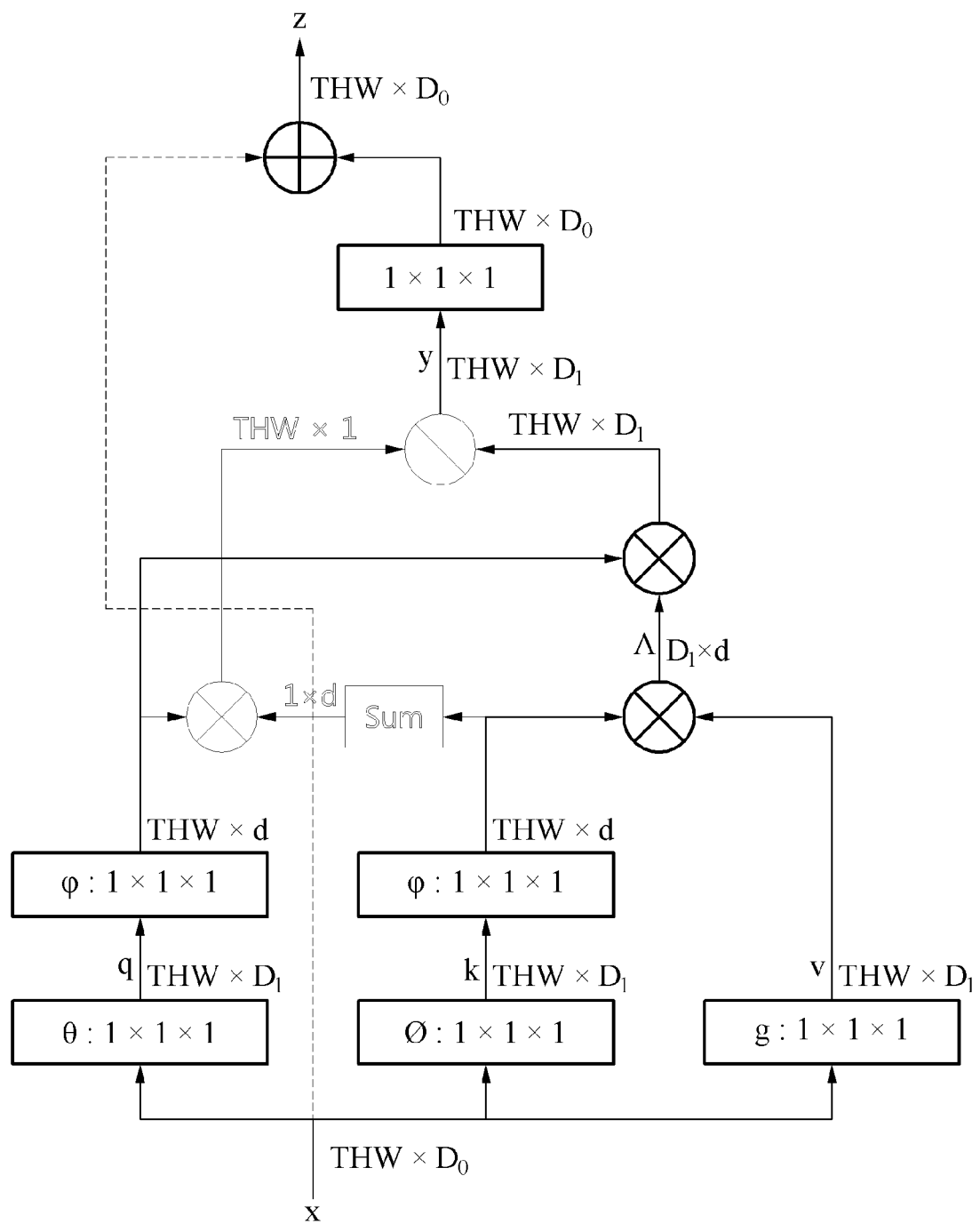
FIG. 6 illustrates an example of data processing in a scheme of using key-value coupling.

FIGS. 4 and 5 illustrate examples of data processing in a scheme of using a key-value pair in an unpaired state. FIGS. 4 and 5, and FIG. 6, which will be described later below, illustrate examples of generating a query, a key, and a value based on input data (for example, a self-attention of an attention algorithm).

Referring to FIG. 4, input data x is input. For example, the input data x may correspond to pixels in a target patch of an input image or an input feature vector of an attention network. A dimension of the input data x may be $T*H*W*D_0$. Here, T denotes a number of video frames. H, W, and $D_0$ denote a height, a width, and a depth, respectively, when the input data x is depicted as a rectangular parallelepiped. $D_0$ correspond to a number of channels of the input data x.

Query data q may be generated through a transformation θ related to the input data x, key data k may be generated through a transformation φ related to the input data x, and value data v may be generated through a transformation g related to the input data x. Dimensions of the query data q, the key data k, and the value data v may each be $T*H*W*D_1$. In a transformation process, $D_0$ may be changed to $D_1$. For example, $D_1$ may be greater than $D_0$. In FIG. 4, "1*1*1" indicates a 1*1*1 convolution, as a non-limiting convolution example.

Next, in an example of FIG. 4, an operation between the query data q and the key data k is performed. In FIG. 4, ⊗ denotes a matrix multiplication, and ⊕ denotes an elementwise addition. In this example, a dimension of a result of the operation between the query data q and the key data k may be indicated as $(T*H*W)^2$. An example of a memory use of the result of the operation between the query data q and the key data k will be described further with reference to FIG. 5.

Referring to FIG. 5, an example of a memory space 550 used depending on a result of an operation between query data 510 and key data 520 is illustrated. In an example, T=1(for example, a single image), and dimensions of the query data 510 and the key data 520 are H*W*D. However, in other examples, T may be greater than 1. The query data 510 may include multiple queries including a first query 511, and the key data 520 may include multiple keys including a first key 521.

A result of an operation between the first query 511 and each key of the key data 520 occupies a space 551. Further, results of operations between the remaining queries of the query data 510 and each key of the key data 520 occupy a remaining portion of the memory space 550 excluding the space 551. Thus, the result of the operation between the query data 510 and the key data 520 occupies the memory space 550 of $(HW)^2$.

Referring to FIG. 4 again, softmax may be applied to the result of the operation between the query data q and the key data k. Softmax is construed as normalizing the result of the operation between the query data q and the key data k. Next, output data y may be generated based on an operation between value data v and a softmax output. A dimension of the output data y is $T*H*W*D_1$. Then, the dimension of the output data y may be adjusted based on the input data x, and an operation result z according to a residual connection is output. After the output data y is generated, a process of generating the operation result z may be selectively applied.

FIG. 6 illustrates an example of one or more embodiments of data processing in a scheme of using key-value coupling. Referring to FIG. 6, input data x is input. For example, the input data x may correspond to pixels of an input image or an input feature vector of an attention network. A dimension of the input data x may be $T*H*W*D_0$. Notations of T, H, W, and $D_0$ are the same as those in FIG. 4.

In the same manner as described with reference to FIG. 4, query data q, key data k, and value data v are generated, and dimensions thereof may each be $T*H*W*D_1$. Next, new query data may be generated using a nonlinear transformation φ related to the query data q, and new key data may be generated using a nonlinear transformation φ related to the key data k. In a nonlinear transformation process, $D_1$ may be changed to d.

Then, key-value coupling data Λ may be generated based on an operation between the new key data and the value data v. In FIG. 6, ⊗ denotes a matrix multiplication, ⊕ denotes an elementwise addition, and ⊘ denotes an elementwise division. A dimension of the key-value coupling data Λ is indicated as $D_1*d$.

When the key-value coupling data Λ is generated, an operation between the new query data and the key-value coupling data Λ may be performed. A dimension of a result of the operation may be T*H*W*D1, a normalization may be performed on a result of the corresponding operation, and output data y may be generated as a result of the normalization. As shown in the example of one or more embodiments illustrated in FIG. 6, when the key-value coupling data Λ is used, a large memory space of (T*H*W)^2 is not required compared to in the typical example of FIG. 4. Then, a dimension of the output data y may be adjusted based on the input data x, and an operation result z according to a residual connection is output. After the output data y is generated, a process of generating the operation result z may be selectively applied.

Figure 7:
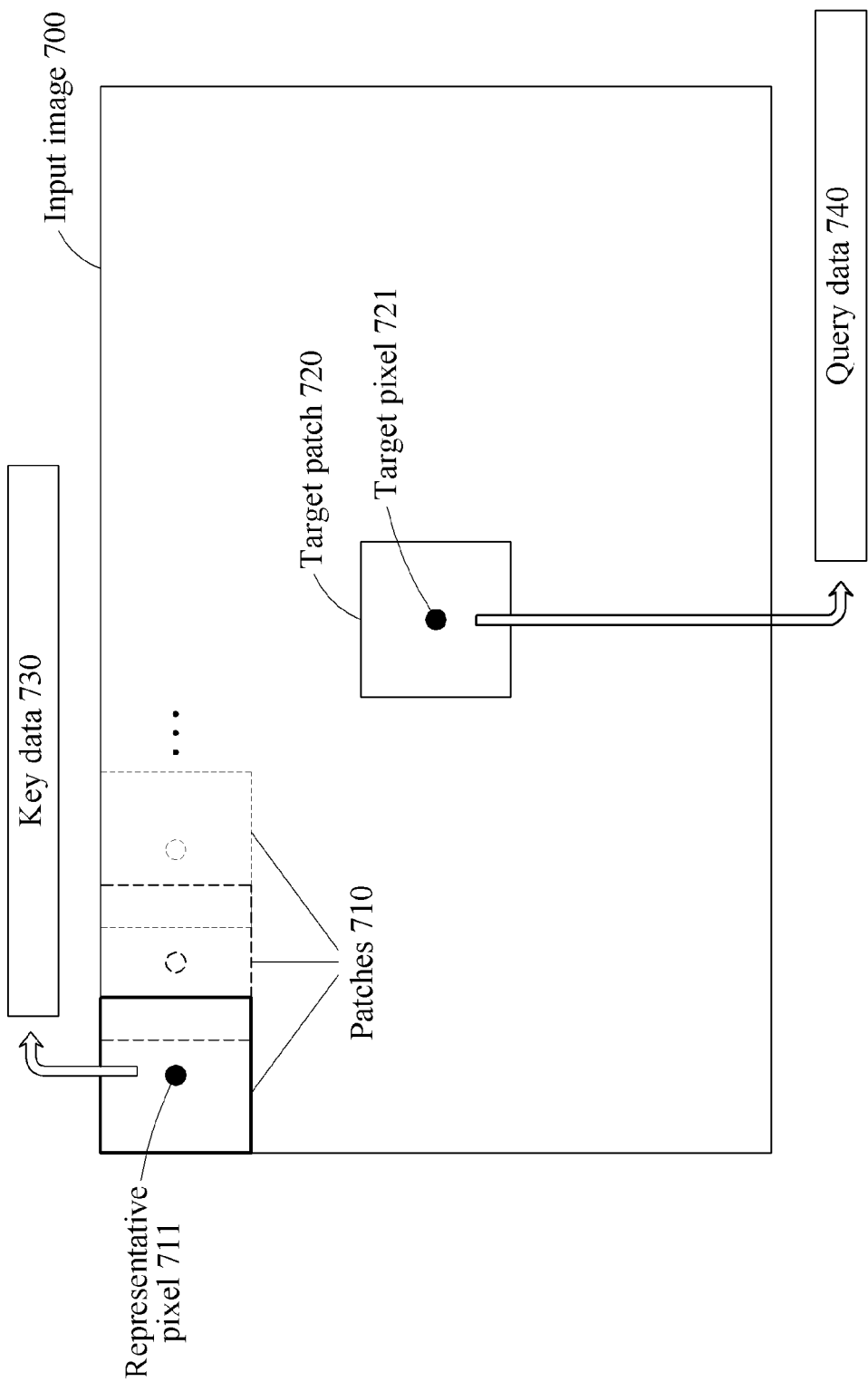
FIG. 7 illustrates an example of nonlocal filtering.

FIG. 7 illustrates an example of nonlocal filtering. Referring to FIG. 7, patches 710 of an input image 700 are shown. The patches 710 may have the same size, and may be uniformly disposed in the input image 700. Depending on an example, a number and a size of the patches 710 may vary. For example, the patches 710 may overlap each other.

Each of the patches 710 may include a representative pixel 711. For example, the representative pixel 711 may be a center pixel of each patch 710. A pixel being a target of denoising in the input image 700 may be referred to as a target pixel 721, and a patch including the target pixel 721 may be referred to as a target patch 720. The target pixel 721 may correspond to a representative pixel of the target patch 720. An image processing apparatus may perform denoising on noise components by sequentially designating pixels in the input image 700 as the target pixel 721 (e.g., until all of the pixels have been designated as the target pixel 721).

The image processing apparatus may compare the target patch 720 and the patches 710 for nonlocal filtering, and may calculate a weighted average of representative pixels 711 of the patches 710 by assigning weights according to similarities between the target patch 720 and the patches 710 to the representative pixels 711 of the patches 710. The calculated weighted average may correspond to output data. The image processing apparatus may use the output data for denoising of the target pixel 721. For example, a pixel value according to the output data may be assigned to the target pixel 721.

Key-value coupling data may be used for the nonlocal filtering process. Key data 730 may be determined based on pixel values of pixels in the patches 710, and value data may be determined based on the representative pixels 711 of the patches 710. Further, query data 740 may be determined based on pixel values of pixels in the target patch 720. Here, a process using the key-value coupling data described above may be applied.

In detail, the image processing apparatus may obtain key-value coupling data generated based on an operation between the value data and new key data generated using a nonlinear transformation related to the key data 730. Then, the image processing apparatus may generate output data for denoising of the target pixel 721, based on an operation between the key-value coupling data and new query data generated using a nonlinear transformation related to the query data 740. In addition, the description provided with reference to FIGS. 1 through 6 may also apply to the example of FIG. 7. Through the above process of one or more embodiments, a complexity of operation for nonlocal filtering decreases greatly compared to a complexity of operation for nonlocal filtering of a typical process.

Figure 8:
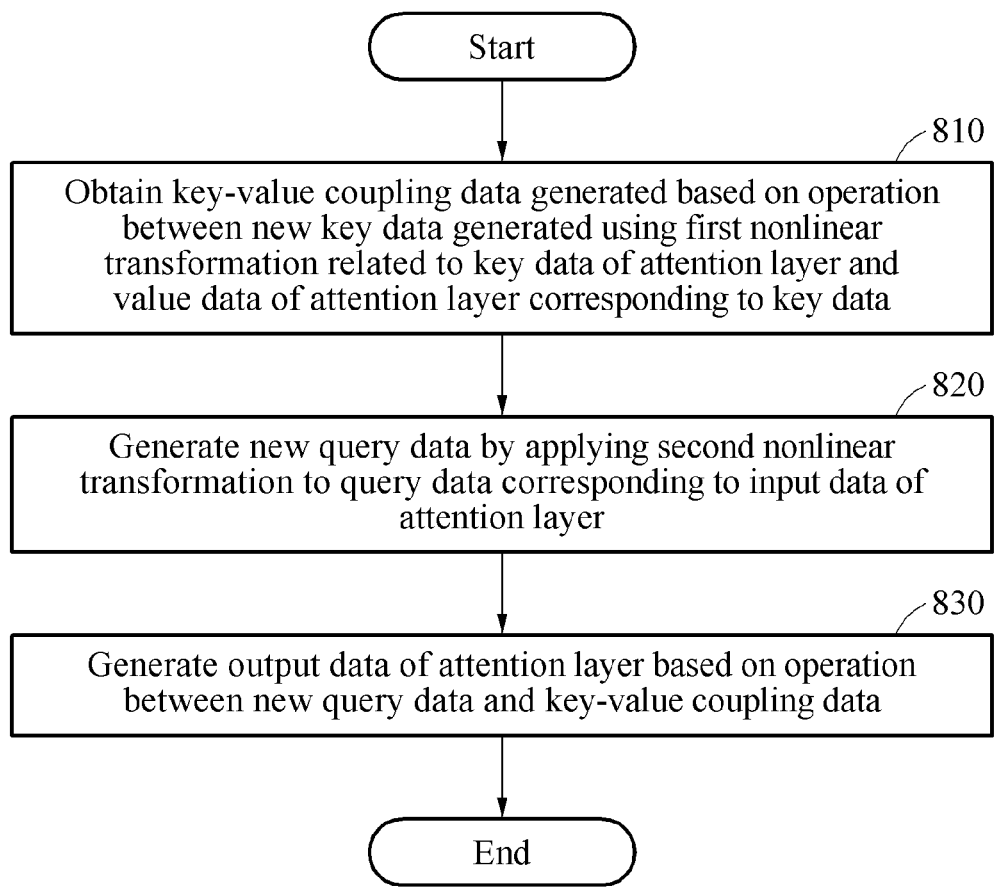
FIG. 8 illustrates an example of a method of implementing an attention mechanism using key-value coupling.

FIG. 8 illustrates an example of a method of implementing an attention mechanism using key-value coupling. Referring to FIG. 8, in operation 810, a neural network apparatus may obtain key-value coupling data generated based on an operation between new key data generated using a first nonlinear transformation related to key data of an attention layer and value data of the attention layer corresponding to the key data. In operation 820, the neural network apparatus may generate new query data by applying a second nonlinear transformation to query data corresponding to input data of the attention layer. In operation 830, the neural network apparatus may generate output data of the attention layer based on an operation between the new query data and the key-value coupling data. In addition, the description provided with reference to FIGS. 1 through 6 may apply to the method of FIG. 8.

Figure 9:
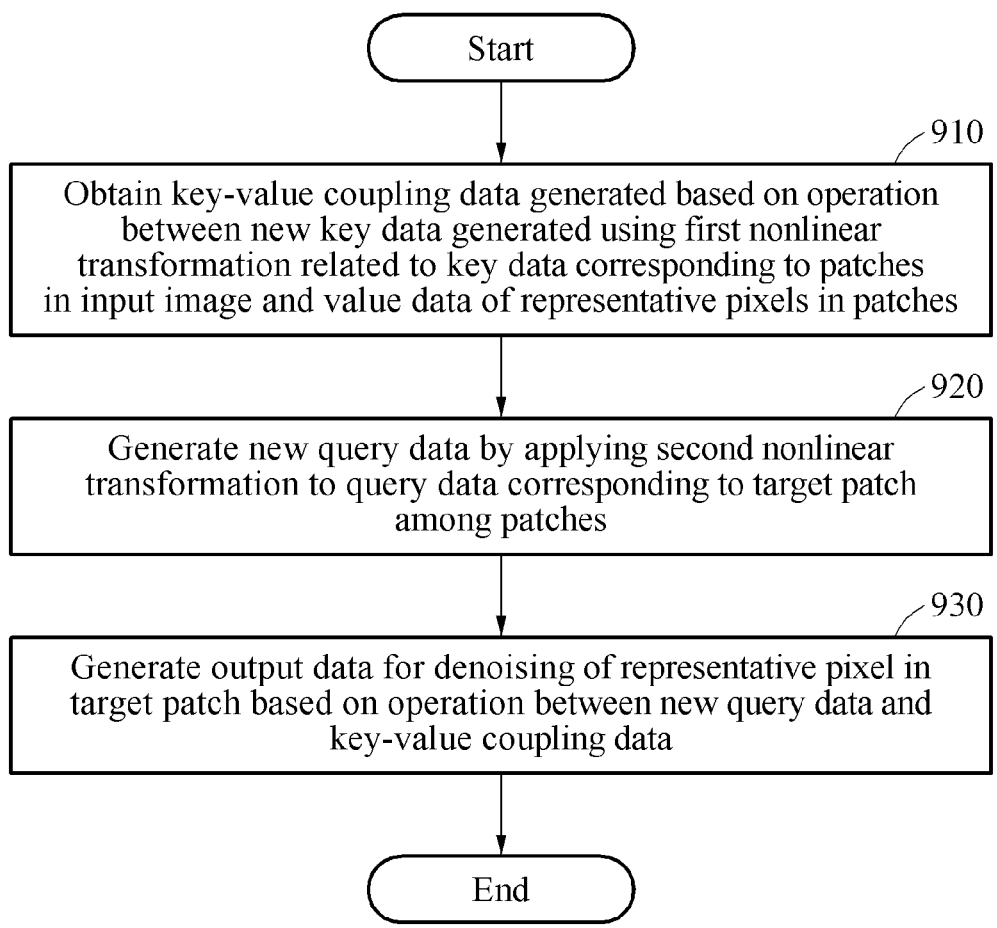
FIG. 9 illustrates an example of a nonlocal filtering method using key-value coupling.

FIG. 9 illustrates an example of a nonlocal filtering method using key-value coupling. Referring to FIG. 9, in operation 910, an image processing apparatus may obtain key-value coupling data generated based on an operation between new key data generated using a first nonlinear transformation related to key data corresponding to patches in an input image and value data of representative pixels in the patches. In operation 920, the image processing apparatus may generate new query data by applying a second nonlinear transformation to query data corresponding to a target patch among the patches. In operation 930, the image processing apparatus may generate output data for denoising of a representative pixel in the target patch, based on an operation between the new query data and the key-value coupling data. In addition, the description provided with reference to FIGS. 1 through 7 may apply to the nonlocal filtering method of FIG. 9.

Figure 10:
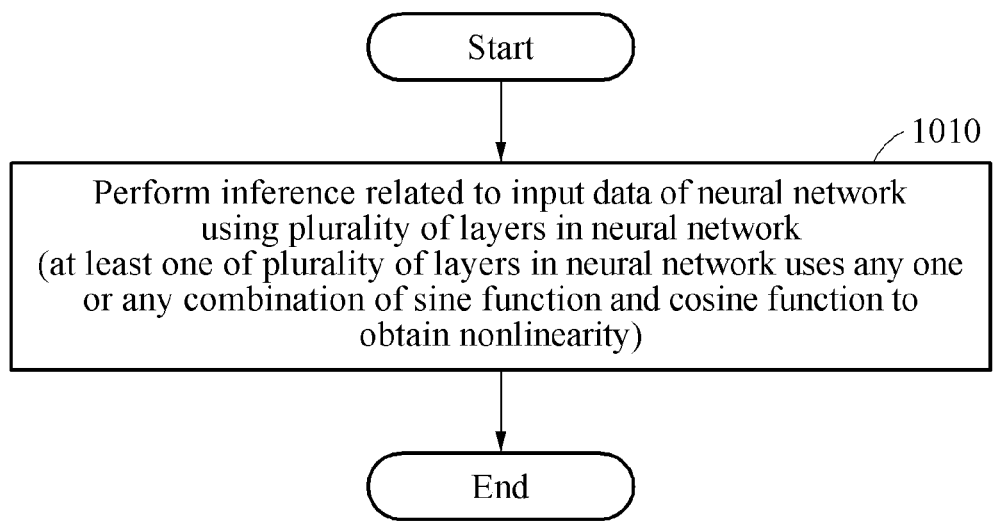
FIG. 10 illustrates an example of a method of implementing a neural network.

FIG. 10 illustrates an example of a method of implementing a neural network. Referring to FIG. 10, in operation 1010, a neural network apparatus may perform an inference related to input data of a neural network using a plurality of layers in the neural network. At least one of the plurality of layers in the neural network may use either one or both of a sine function and a cosine function, as non-limiting examples, to obtain a nonlinearity. As described with reference to FIGS. 1 through 6, a nonlinearity may be assigned to the neural network through the example sine function and/or cosine function, and the neural network may perform the inference related to the input data based on the nonlinearity assigned through the sine function and the cosine function and with respect to the remaining trained parameters of the neural network. For example, one or more layers in the neural network may include respective attention layers which perform respective attention mechanisms. In addition, the description provided with reference to FIGS. 1 through 6 may apply to the method of FIG. 10.

Figure 11:
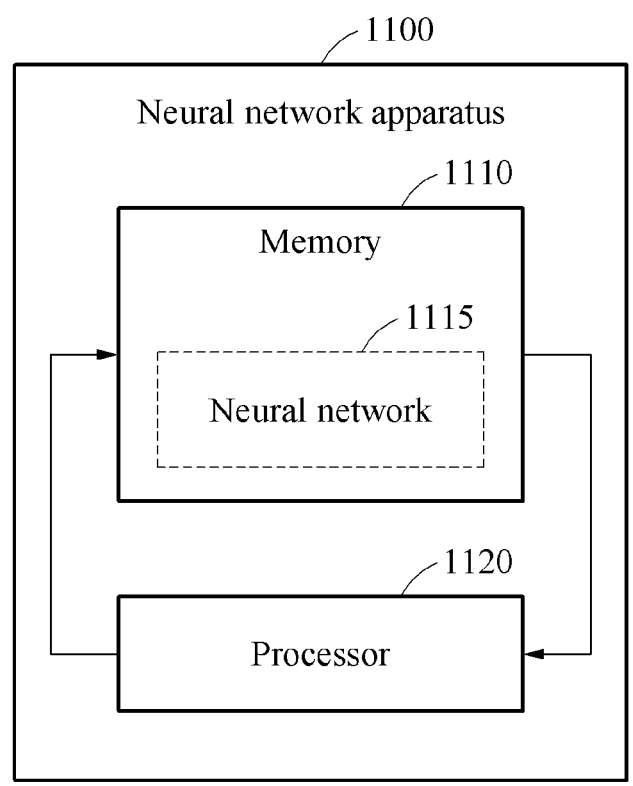
FIG. 11 illustrates an example of a neural network apparatus.

FIG. 11 illustrates an example of a neural network apparatus. Referring to FIG. 11, a neural network apparatus 1100 includes a memory 1110 and a processor 1120. The memory 1110 stores a neural network 1115. The memory 1110 stores instructions executable by the processor 1120. When the instructions stored in the memory 1110 are executed by the processor 1120, the processor 1120 performs the operations described with reference to FIGS. 1 through 6, 8, and 10. In addition, the description provided with reference to FIGS. 1 through 6, 8, and 10 applies to the neural network apparatus 1100.

Figure 12:
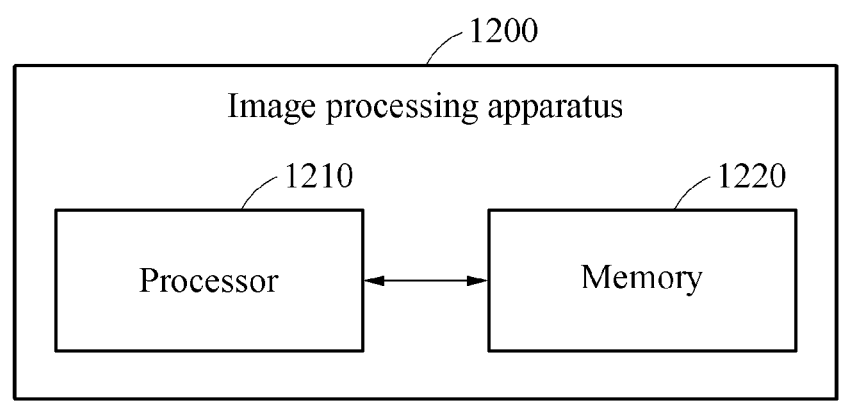
FIG. 12 illustrates an example of an image processing apparatus.

FIG. 12 illustrates an example of an image processing apparatus, such as a mobile device example performing an image capturing or processing function. Referring to FIG. 12, an image processing apparatus 1200 includes a memory 1210 and a processor 1220. The memory 1210 stores instructions executable by the processor 1220. When the instructions stored in the memory 1210 are executed by the processor 1220, the processor 1220 performs the operations described with reference to FIGS. 1 through 7, and 9. In addition, the description provided with reference to FIGS. 1 through 7, and 9 applies to the image processing apparatus 1200.

The neural network apparatuses, neural network apparatus 1100, image processing apparatuses, image processing apparatus 1200, memories, memory 1110, memory 1210, processors, processor 1120, processor 1220, and other apparatuses, units, modules, devices, and other components described herein with respect to FIGS. 1-12 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-12 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method of implementing an attention mechanism in a neural network, the method comprising:
   obtaining key-value coupling data determined based on an operation between new key data determined using a first nonlinear transformation for key data of an attention layer, and value data of the attention layer corresponding to the key data;
   determining new query data by applying a second nonlinear transformation to query data corresponding to input data of the attention layer; and
   determining output data of the attention layer based on an operation between the new query data and the key-value coupling data without a similarity operation determining a similarity between the query data and the key data,
   wherein the first nonlinear transformation corresponds to a first operation factor divided from a similarity operation, the second nonlinear transformation corresponds to a second operation factor divided from the similarity operation,
   wherein the first operation factor and the second operation factor are obtained by factorize the similarity operation, and
   wherein the key-value coupling data is fixed by being determined, independent of the query data, based on the operation between the new key data and the value data.

2. The method of claim 1, wherein the obtaining comprises:
   determining the new key data by applying the first nonlinear transformation to the key data; and
   determining the key-value coupling data based on an operation between the value data and the new key data.

3. The method of claim 1, wherein
   the new key data includes a first new key, and the value data includes a first value corresponding to the first new key, and
   the key-value coupling data includes a single item of aggregated data determined based an operation between the first new key and the first value with respect to a first key-value pair of the first new key and the first value.

4. The method of claim 1, wherein either one or both of the first nonlinear transformation and the second nonlinear transformation uses either one or both of a sine function and a cosine function as a nonlinear factor.

5. The method of claim 1, wherein the first nonlinear transformation and the second nonlinear transformation use the same function.

6. The method of claim 1, wherein
   the output data of the attention layer is determined based on an operation between the new query data and the fixed key-value coupling data.

7. The method of claim 1, wherein an operation between the new key data and the new query data corresponds to a similarity between the key data and the query data.

8. The method of claim 1, wherein the determining of the output data of the attention layer comprises normalizing a result of the operation between the new query data and the key-value coupling data.

9. The method of claim 1, further comprising performing an inference operation using the neural network based on the output data of the attention layer, wherein the neural network includes additional trained layers.

10. The method of claim 1, further comprising outputting an image recognition result for the input data by applying the output data of the attention layer to the neural network.

11. A non-transitory computer-readable storage medium storing instructions that, when executed by one or more processors, cause the one or more processors to perform the method of claim 1.

12. A processor-implemented nonlocal filtering method, comprising:
   obtaining key-value coupling data determined based on an operation between new key data determined using a first nonlinear transformation for key data corresponding to patches in an input image, and value data of representative pixels in the patches;
   determining new query data by applying a second nonlinear transformation to query data corresponding to a target patch among the patches; and
   determining output data for denoising of a representative pixel in the target patch, based on an operation between the new query data and the key-value coupling data without a similarity operation determining a similarity between the query data and the key data,
   wherein the first nonlinear transformation corresponds to a first operation factor divided from a similarity operation, the second nonlinear transformation corresponds to a second operation factor divided from the similarity operation,
   wherein the first operation factor and the second operation factor are obtained by factorize the similarity operation, and
   wherein the key-value coupling data is fixed by being determined, independent of the query data, based on the operation between the new key data and the value data.

13. The method of claim 12, wherein the representative pixels in the patches are center pixels in the patches, and the representative pixel in the target patch is a center pixel in the target patch.

14. The method of claim 12, wherein the obtaining comprises:
   determining the new key data by applying the first nonlinear transformation to the key data; and
   determining the key-value coupling data based on an operation between the value data and the new key data.

15. The method of claim 12, wherein
   the new key data includes a first new key, and the value data includes a first value corresponding to the first new key, and
   the key-value coupling data includes a single item of aggregated data determined based on an operation between the first new key and the first value with respect to a first key-value pair of the first new key and the first value.

16. The method of claim 12, wherein either one or both of the first nonlinear transformation and the second nonlinear transformation uses either one or both of a sine function and a cosine function as a nonlinear factor.

17. The method of claim 12, wherein the first nonlinear transformation and the second nonlinear transformation use the same function.

18. The method of claim 12, wherein an operation between the new key data and the new query data corresponds to a similarity between the key data and the query data.

19. The method of claim 12, further comprising denoising the representative pixel in the target patch based on the output data.

* * * * *